J. C. HENRY.
Plow-Fender.
No. 67,542. Patented Aug. 6, 1867.
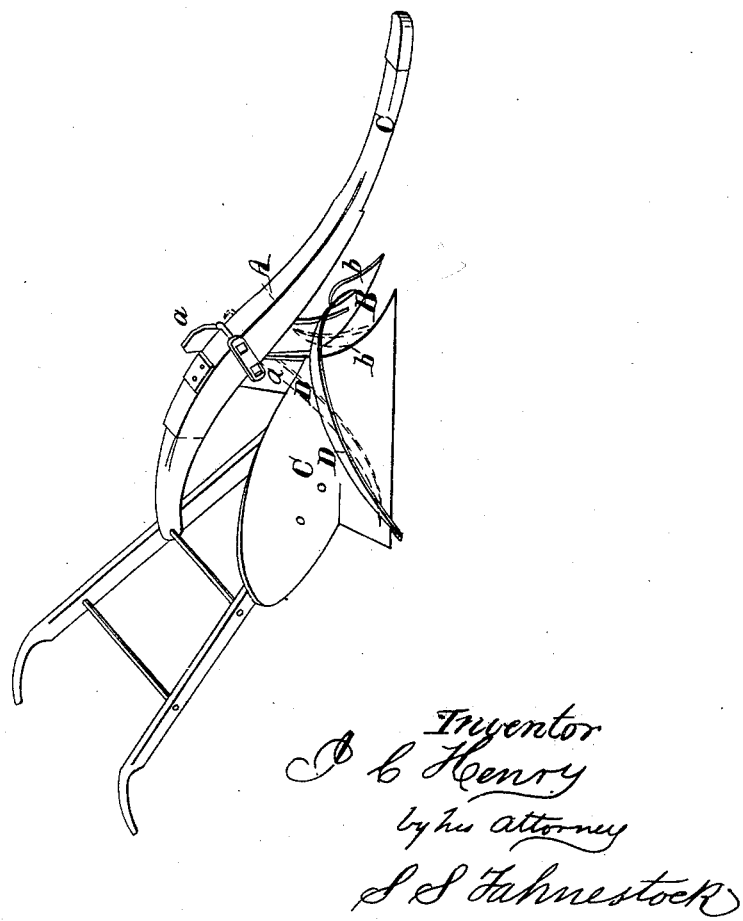
Witnesses
Theodore Lang
J. McMister
Inventor
J. C. Henry
by his attorney
S. S. Fahnestock

United States Patent Office.

JOHN C. HENRY, OF POINT DOUGLAS, MINNESOTA.

Letters Patent No. 67,542, dated August 6, 1867.

IMPROVEMENT IN PLOUGHS.

The Schedule referred to in these Letters Patent and making part of the same.

TO ALL WHOM IT MAY CONCERN:

Be it known that I, JOHN C. HENRY, of Point Douglas, in the county of Washington, and State of Minnesota, have invented a certain new and useful Improvement in Ploughs; and I do hereby declare that the following is a clear, full, and exact description of the same, reference being had to the accompanying drawings, and to the letters of reference marked thereon.

The nature of my invention consists in the attachment to any ordinary plough of a stubble-turner, to be hereafter described.

To enable those skilled in the art to make and use my invention, I will proceed to describe its operation and construction, which is as follows:

The drawings represent an ordinary plough in perspective. Attached to the beam A of the same, in any suitable mechanical manner, and made adjustable, within desirable limits, is my stubble-turner B. The plough, its shares, mould-board, &c., need no special description, may turn a furrow either or both ways. The stubble-turner B may be so placed as to operate on either or both sides, according to the shape of the mould-board, &c. It is made of a bar of iron similar to that of a plough-coulter, standing over and coming near to the point of the plough, with ordinary fastenings to stem $c$. Next below the piece $a$, which is secured to beam A, is a long arm or finger, D, which curves along the front and side of mould-board C, first rising and then descending near to the ground. Below D is another shorter finger, $b$, at the extreme end of B. It is also curved. These fingers may be curved in any desirable way. In red outline in the drawing a modification of my invention is shown. I have long finger D attached more directly to the beam A, and the other finger curved the contrary way.

The operation is as follows, viz: That as the plough is moved forward the stubble-turner before described gathers all the stubble and rubbish in front of the plough, and lays it in the bottom of the last furrow, without clogging the plough, so completely that the furrow being turned by the plough, covers it entirely out of sight.

Having thus described my invention, what I claim as new and useful, and desire to secure by Letters Patent of the United States, is as follows:

The combination of the mould-board C and the stubble-turner B, arranged, constructed, and operating in the manner as shown and described.

JOHN C. HENRY.

Witnesses:
CHAS. E. LEONARD,
JOHN H. HONE.